(12) United States Patent
Miyaishi et al.

(10) Patent No.: US 10,377,368 B2
(45) Date of Patent: Aug. 13, 2019

(54) CONTROL DEVICE FOR HYBRID VEHICLE

(71) Applicants: JATCO Ltd, Fuji-shi, Shizuoka (JP); NISSAN MOTOR CO., LTD., Yokohama-shi, Kanagawa (JP)

(72) Inventors: Hironori Miyaishi, Sagamihara (JP); Tomoyuki Mizuochi, Sagamihara (JP); Kenichi Watanabe, Sagamihara (JP); Masumi Fujikawa, Sagamihara (JP); Kouichi Kotsuji, Numazu (JP); Shingo Suzuki, Zama (JP); Akito Suzuki, Tokyo (JP); Tetsuya Izumi, Ayase (JP); Keisuke Iwado, Ebina (JP); Takanobu Mouri, Kanagawa (JP); Taiichi Onoyama, Kanagawa (JP); Seishi Shimamura, Kanagawa (JP); Akihiro Toyofuku, Kanagawa (JP); Ryuichi Arai, Kanagawa (JP); Kakuzou Kaneko, Kanagawa (JP); Ryuzo Noguchi, Kanagawa (JP); Satoshi Harui, Kanagawa (JP)

(73) Assignees: JATCO LTD, Fuji-shi (JP); NISSAN MOTOR CO., LTD., Yokohama-shi (JP)

(*) Notice: Subject to any disclaimer, the term of this patent is extended or adjusted under 35 U.S.C. 154(b) by 30 days.

(21) Appl. No.: 15/558,809

(22) PCT Filed: Feb. 3, 2016

(86) PCT No.: PCT/JP2016/053166
§ 371 (c)(1),
(2) Date: Sep. 15, 2017

(87) PCT Pub. No.: WO2016/147727
PCT Pub. Date: Sep. 22, 2016

(65) Prior Publication Data
US 2018/0072308 A1    Mar. 15, 2018

(30) Foreign Application Priority Data

Mar. 17, 2015 (JP) ................ 2015-053973

(51) Int. Cl.
*B60K 6/48* (2007.10)
*B60K 6/543* (2007.10)
(Continued)

(52) U.S. Cl.
CPC ............... *B60W 20/40* (2013.01); *B60K 6/48* (2013.01); *B60K 6/543* (2013.01); *B60L 50/16* (2019.02);
(Continued)

(58) Field of Classification Search
CPC ...... B60W 20/13; B60W 10/08; B60W 10/10; B60W 20/00; B60K 6/48; B60K 6/543; B60L 11/14; F02D 29/00; F02D 29/02
(Continued)

(56) References Cited

U.S. PATENT DOCUMENTS

| | | |
|---|---|---|
| 2013/0053214 A1 | 2/2013 | Kawai et al. |
| 2013/0191012 A1 | 7/2013 | Hirotsu et al. |
| 2015/0051767 A1 | 2/2015 | Mohri |

FOREIGN PATENT DOCUMENTS

| | | |
|---|---|---|
| JP | 2012-086710 A | 5/2012 |
| JP | 2012-091552 A | 5/2012 |

(Continued)

*Primary Examiner* — Maceeh Anwari
(74) *Attorney, Agent, or Firm* — Foley & Lardner LLP (57) ABSTRACT

A controller is provided so as to control, when an electric vehicle (EV) mode is selected, a belt clamping pressure on the basis of discharged oil from a main oil pump which is driven by a motor generator. The controller is provided for a hybrid vehicle and is configured to perform control such that when the vehicle is stopped in the EV mode and a creep cut condition which does not require creep torque from the motor generator is met, a first motor idling rotation speed is set as a motor rotation speed. When the vehicle is stopped in the EV mode and a standby learning control completes learning of a zero-point oil pressure command value, the controller reduces a rotation speed of the motor generator to a second motor idling rotation speed which is lower than the first motor idling rotation speed.

8 Claims, 5 Drawing Sheets

(51) Int. Cl.
  *B60L 50/16* (2019.01)
  *B60W 10/08* (2006.01)
  *B60W 10/10* (2012.01)
  *B60W 20/00* (2016.01)
  *B60W 20/13* (2016.01)
  *B60W 20/40* (2016.01)
  *F02D 29/00* (2006.01)
  *F02D 29/02* (2006.01)

(52) U.S. Cl.
  CPC ............ *B60W 10/08* (2013.01); *B60W 10/10* (2013.01); *B60W 20/00* (2013.01); *B60W 20/13* (2016.01); *F02D 29/00* (2013.01); *F02D 29/02* (2013.01); *B60W 2510/0642* (2013.01); *B60W 2510/081* (2013.01); *Y02T 10/6221* (2013.01); *Y02T 10/7077* (2013.01)

(58) Field of Classification Search
  USPC ......................................................... 701/22
  See application file for complete search history.

(56) References Cited

FOREIGN PATENT DOCUMENTS

| | | | |
|---|---|---|---|
| JP | 201286710 A | * | 10/2012 |
| JP | 2013-049327 A | | 3/2013 |
| JP | 2013-151175 A | | 8/2013 |
| WO | WO-2013/077161 A1 | | 5/2013 |
| WO | WO2013077161 A1 | * | 5/2013 |

* cited by examiner

FIG. 3
[ENTRY]

FIG. 4

[EXIT]

EXAMPLE) SITUATION OF EXIT BY DRIVER'S OPERATION

CONTROL DEVICE FOR HYBRID VEHICLE

TECHNICAL FIELD

The present invention relates to a hybrid vehicle control device for a hybrid vehicle where a motor idle control is performed when the hybrid vehicle is stationary with an EV mode selected.

BACKGROUND ART

Conventionally, an idle control device for a hybrid vehicle is known which is configured to reduce a target idle rotational speed when an automatic transmission is shifted from an N-range to a D-range while an engine is operating at idle (see a patent document 1, for example).

However, the conventional device is confronted by a problem that if a motor idle control is performed to control rotational speed of a motor to an idle rotational speed when the vehicle is stationary with an EV mode selected, in a running scene such as one on a congested road where the vehicle stops frequently, power consumption for driving the motor increases to reduce a state of charge of a battery so that a total energy balance adversely affects mode fuel efficiency.

PRIOR ART DOCUMENT(S)

Patent Document(s)

Patent Document 1: JP 2012-091552 A

SUMMARY OF THE INVENTION

The present invention is made with attention to the problem described above, and is targeted for providing a hybrid vehicle control device for a hybrid vehicle with which when the hybrid vehicle is stationary with an EV mode selected, power consumption of a motor is suppressed to enhance mode fuel efficiency.

In order to accomplish the target described above, according to the present invention, a hybrid vehicle control device for a hybrid vehicle, wherein: the hybrid vehicle includes a driveline, wherein the driveline includes an engine, a motor, a belt-type continuously variable transmission, and a friction clutch, wherein the belt-type continuously variable transmission is configured to controlled hydraulically, and wherein the friction clutch is disposed in a driving force transmission line between the motor and a driving wheel; the belt-type continuously variable transmission includes a primary pulley, a secondary pulley, and a belt, wherein the belt is wound over the primary pulley and the secondary pulley, and configured to be clamped by a primary pulley pressure as a belt-clamping pressure at the primary pulley and a secondary pulley pressure as a belt-clamping pressure at the secondary pulley; and the hybrid vehicle employs an EV mode as a drive mode, and is configured to control the belt-clamping pressures based on a discharge oil of an oil pump when the EV mode is selected, wherein the EV mode employs the motor as a drive source without employing another drive source, and wherein the oil pump is configured to be driven by the motor; the hybrid vehicle control device comprises: an obtaining means configured to obtain a parameter set including at least a motor torque value, wherein the motor torque value is a value of torque of the motor; a standby learning control means configured to learn a zero-point oil pressure command value based on the parameter set, wherein the friction clutch starts to have a non-zero torque capacity at the zero-point oil pressure command value; and a motor idle control means configured to control rotational speed of the motor to a first motor idle rotational speed, in response to a satisfaction of a creep-cut condition requiring no creep torque of the motor when the hybrid vehicle is stationary with the EV mode selected; wherein the motor idle control means is further configured to reduce the rotational speed of the motor to a second motor idle rotational speed, in response to a completion of the learning of the zero-point oil pressure command value by the standby learning control means, wherein the second motor idle rotational speed is lower than the first motor idle rotational speed.

Accordingly, the rotational speed of the motor is reduced to the second motor idle rotational speed, in response to the condition that the vehicle is stationary with the EV mode selected, and the learning of the zero-point oil pressure command value is completed by the standby learning control means, wherein the second motor idle rotational speed is lower than the first motor idle rotational speed. The reduction from the first motor idle rotational speed to the second motor idle rotational speed, wherein the first motor idle rotational speed is before the learning of the zero-point oil pressure command value is completed by the standby learning control means, serves to suppress power consumption of the motor by the differential rotational speed during the motor idle control. This serves to suppress the state of charge of a battery for power supply to the motor from falling, and thereby shorten a time period when an engine generation mode is selected to charge the battery by driving the motor by the engine, as compared to a condition that a normal motor idle control is performed based on the first motor idle rotational speed before the learning of the zero-point oil pressure command value is completed by the standby learning control means. This serves to suppress power consumption of the motor when the vehicle is stationary with the EV mode selected, and thereby enhance the mode fuel efficiency.

MODE(S) FOR CARRYING OUT THE INVENTION

The following describes the best mode for carrying out a hybrid vehicle control device according to the present invention, with reference to a first embodiment shown in the drawings.

First Embodiment

First, the following describes configuration. The control device according to the first embodiment is applied to an FF hybrid vehicle as an example of hybrid vehicle where left and right front wheels are driving wheels, and a belt-type continuously variable transmission is mounted as a transmission. The following describes configuration of the control device of the FF hybrid vehicle according to the first embodiment, separately in sections [Whole System Configuration] and [Configuration of Process of Motor Idle Control].

Figure 1:
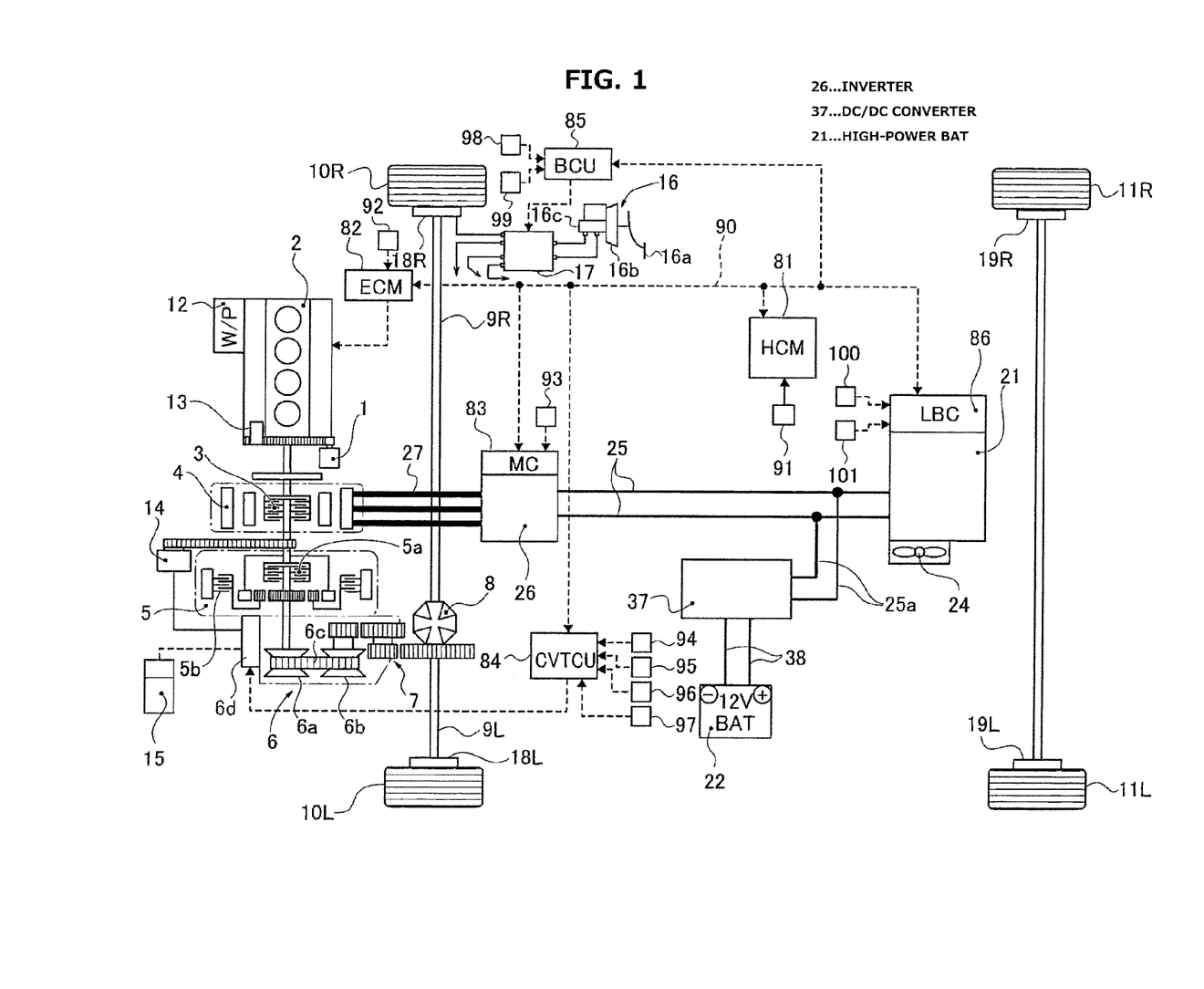
FIG. 1 is a whole system diagram showing an FF hybrid vehicle to which a control device according to a first embodiment is applied.

[Whole System Configuration] FIG. 1 is a whole system diagram showing the FF hybrid vehicle to which the control device according to the first embodiment is applied. The following describes whole system configuration of the FF hybrid vehicle with reference to FIG. 1.

The FF hybrid vehicle includes a driveline including a transversely mounted engine 2, a first clutch 3 (CL1 for short), a motor generator 4 (MG for short), a second clutch 5 (CL2 for short), and a belt-type continuously variable transmission 6 (CVT for short), as shown in FIG. 1. Belt-type continuously variable transmission 6 includes an output shaft which is drivingly connected to left and right front wheels 10L, 10R via a final reduction gear train 7, a differential gear 8, and left and right drive shafts 9L, 9R. Left and right rear wheels 11L, 11R are non-driving wheels.

Transversely mounted engine 2 is arranged in a front room along with a starter motor 1, having a crankshaft axis in a vehicle lateral direction, and including an electric water pump 12 and a crankshaft rotation sensor 13, wherein crankshaft rotation sensor 13 is configured to sense reverse rotation of transversely mounted engine 2. Transversely mounted engine 2 employs a starter start mode and an MG start mode as start modes, wherein the starter start mode is configured to perform cranking by starter motor 1 with power supply from a 12V-battery 22, and wherein the MG start mode is configured to perform cranking by motor generator 4 with first clutch 3 slip-engaged. The starter start mode is selected in response to a satisfaction of a condition of low temperature or a condition of high temperature, whereas the MG start mode is selected in response to conditions other than the condition for starter starting.

Motor generator 4 is a three-phase alternating current permanent magnet type synchronous motor, which is connected to transversely mounted engine 2 via first clutch 3. Motor generator 4 is configured to receive power supply from a high-power battery 21 described below, and includes a stator coil connected to an inverter 26 via an AC harness 27, wherein inverter 26 is configured to convert a direct current to three-phase alternating currents in a state of power operation, and convert three-phase alternating currents to a direct current in a state of regenerative operation.

Second clutch 5 is a wet-type multiplate frictional clutch, which is disposed between motor generator 4 and left and right front wheels 10L, 10R as driving wheels, and is configured to be hydraulically operated, and controlled by a second clutch oil pressure into a completely engaged state, a slip-engaged state, or a disengaged state. In the first embodiment, second clutch 5 is implemented by a forward drive clutch 5a and a rearward drive clutch 5b, which are provided in a forward-rearward switching mechanism based on planetary gear arrangement. Specifically, during forward running, forward drive clutch 5a is employed as second clutch 5, and during rearward running, rearward drive clutch 5b is employed as second clutch 5.

Belt-type continuously variable transmission 6 includes a primary pulley 6a, secondary pulley 6b, and a belt 6c, wherein belt 6c is wound over pulleys 6a, 6b. Belt-type continuously variable transmission 6 is a transmission configured to vary a transmission ratio continuously by varying diameters of winding of belt 6c by a primary pressure and a secondary pressure which are supplied to a primary oil chamber and a secondary oil chamber, respectively. Belt-type continuously variable transmission 6 includes a main oil pump 14 (mechanism-driven) and an auxiliary oil pump 15 (motor-driven) as hydraulic pressure sources, wherein main oil pump 14 is configured to be rotationally driven by a motor shaft of motor generator 4 (i.e. transmission input shaft), and wherein auxiliary oil pump 15 is employed as an auxiliary pump. Belt-type continuously variable transmission 6 further includes a control valve unit 6d configured to produce a first clutch pressure, a second clutch pressure, the primary pressure, and the secondary pressure, based on a line pressure PL as an original pressure, wherein line pressure PL is generated by regulating a pump discharge pressure from the hydraulic pressure source.

A combination of first clutch 3, motor generator 4, and second clutch 5 forms a hybrid drive system of one-motor and two-clutch type, which employs an EV mode, an HEV mode, and a (HEV)WSC mode as main drive modes. The EV mode is an electric vehicle mode configured to disengage first clutch 3, and engage second clutch 5, and thereby employ motor generator 4 only as a drive source, wherein running or driving in the EV mode is referred to as EV running or driving. The HEV mode is a hybrid vehicle mode configured to engage both of clutches 3, 5, and thereby employ transversely mounted engine 2 and motor generator 4 as drive sources, wherein running or driving in the HEV mode is referred to as HEV running or driving. The WSC mode is a CL2-slip-engaging mode configured to perform a motor rotational speed control of motor generator 4, and slip-engage second clutch 5 with an engagement torque capacity corresponding to a requested driving force, in the HEV mode or in the EV mode. The WSC mode is selected to absorb a rotational difference of transversely mounted engine 2 with left and right front wheels 10L, 10R by slip-engagement of CL2 in a region of vehicle start from stationary state and a region of low speed to stationary state when in the HEV mode, wherein transversely mounted engine 2 rotates at a rotational speed higher than or equal to an engine idle rotational speed. The WSC mode is required because the driveline includes no joint such as torque converter for absorbing a rotational difference.

The FF hybrid vehicle includes a braking system including a brake operation unit 16, a brake fluid pressure control unit 17, left and right front wheel brake units 18L, 18R, and left and right rear wheel brake units 19L, 19R, as shown in FIG. 1. The braking system is configured to perform a cooperative regenerative control in response to a requested braking force by pedal operation, when regeneration is performed by motor generator 4 during brake operation, wherein the cooperative regenerative control is configured to set a hydraulic braking force to cover a component obtained by subtracting a regenerative braking force from the requested braking force.

Brake operation unit 16 includes a brake pedal 16*a*, a vacuum booster 16*b*, a master cylinder 16*c*, etc., wherein vacuum booster 16*b* is configured to employ a negative pressure of intake air of transversely mounted engine 2. Brake operation unit 16 is configured to generate a specific master cylinder pressure in response to a brake-depressing force of a driver applied to brake pedal 16*a*. Brake operation unit 16 has such a simple configuration employing no electric booster.

Brake fluid pressure control unit 17 includes an electric oil pump, a pressure-increasing solenoid valve, a pressure-reducing valve, an oil passage switching valve, etc., not shown. Brake fluid pressure control unit 17 is configured to be controlled by a brake control unit 85, to perform a function to generate wheel cylinder hydraulic pressures when no brake operation is made, and a function to regulate the wheel cylinder hydraulic pressures when brake operation is made. The function to generate the hydraulic pressures when no brake operation is made is employed by controls such as a traction control (TCS control), a vehicle behavior control (VDC control), and an emergency brake control (automatic brake control). The function to regulate the hydraulic pressures when brake operation is made is employed by controls such as a cooperative regenerative control, and an antilock brake control (ABS control).

Left and right front wheel brake units 18L, 18R are provided at left and right front wheels 10L, 10R, respectively, and left and right rear wheel brake units 19L, 19R are provided at left and right rear wheels 11L, 11R, respectively, for applying a hydraulic braking force to each wheel. Each brake unit 18L, 18R, 19L, 19R includes a wheel cylinder not shown which is configured to receive supply of brake fluid pressure generated by brake fluid pressure control unit 17.

The FF hybrid vehicle includes an electric power system which includes high-power battery 21 for power supply to motor generator 4, and 12V-battery 22 for power supply to a 12V-based load, as shown in FIG. 1.

High-power battery 21 is a secondary battery for power supply to motor generator 4, which is implemented by a lithium ion battery or the like where a cell module composed of multiple cells is set in a battery pack case. High-power battery 21 contains a junction box therein, wherein relay circuits are collected in the junction box for supply, breaking, and distribution of high power. High-power battery 21 is further provided with a cooling fan unit 24 having a battery cooling function, and a lithium battery controller 86 for monitoring the state of charge of the battery (battery SOC) and the temperature of the battery.

High-power battery 21 and motor generator 4 are connected to each other via a DC harness 25, inverter 26, and AC harness 27. Inverter 26 is provided with a motor controller 83 for control of power operation and regenerative operation. Namely, inverter 26 is configured to convert the direct current from DC harness 25 to the three-phase alternating currents to AC harness 27, when in a state of power operation where motor generator 4 is driven by discharging of high-power battery 21. On the other hand, inverter 26 is configured to convert the three-phase alternating currents from AC harness 27 to the direct current to DC harness 25, in a state of regenerative operation where high-power battery 21 is charged by generation of motor generator 4.

The 12V-battery 22 is a secondary battery mounted for power supply to a 12V-based load including the starter motor 1 and auxiliary equipment, which is implemented by a lead battery configured to be mounted in an engine vehicle or the like. High-power battery 21 and 12V-battery 22 are connected to each other via a DC branch harness 25*a*, a DC/DC converter 37, and a battery harness 38. The DC/DC converter 37 is configured to convert a voltage of hundreds volts from high-power battery 21 to a voltage of 12V, and configured to be controlled by a hybrid control module 81, to manage the quantity of charge of 12V-battery 22.

The FF hybrid vehicle includes an electronic control system including the hybrid control module 81 (HCM for short) as an electronic control unit having an integrated control function to suitably manage consumed energy of the whole of the vehicle, as shown in FIG. 1. The electronic control system further includes other electronic control units, namely, an engine control module 82 (ECM for short), motor controller 83 (MC for short), a CVT control unit 84 (CVTCU for short), brake control unit 85 (BCU for short), and lithium battery controller 86 (LBC for short). These electronic control units 81, 82, 83, 84, 85, 86 are connected to each other via a CAN communication line 90 (CAN is an abbreviation of Controller Area Network) for bidirectional exchange and sharing of information.

Hybrid control module 81 is configured to perform various integrated controls based on input information from the other electronic control units 82, 83, 84, 85, 86, an ignition switch 91, etc.

Engine control module 82 is configured to perform a start control, a fuel injection control, an ignition control, a fuel cut control, an engine idle rotational speed control, etc., of transversely mounted engine 2, based on input information from hybrid control module 81, an engine rotational speed sensor 92, etc.

Motor controller 83 is configured to perform a power operation control, a regeneration operation control, a motor creep control, a motor idle control, etc., of motor generator 4, by outputting a control command to inverter 26, based on input information from hybrid control module 81, a motor rotational speed sensor 93, etc. Furthermore, motor controller 83 is configured as an obtaining means to obtain a parameter set including at least a value of torque of motor generator 4 (motor torque value). Specifically, motor controller 83 obtains a first parameter set including at least a value of torque of motor generator 4 as a first motor torque value, when a running range is selected, and obtains a second parameter set including at least a value of torque of motor generator 4 as a second motor torque value, when a non-running range is selected (first obtaining means and second obtaining means).

The CVT control unit 84 is configured to output a control command to control valve unit 6*d*, based on input information from hybrid control module 81, an accelerator opening sensor 94, a vehicle speed sensor 95, an inhibitor switch 96, an ATF oil temperature sensor 97, etc. The CVT control unit 84 is configured to perform an engagement hydraulic pressure control of first clutch 3, an engagement hydraulic pressure control of second clutch 5, a shift hydraulic pressure control based on the primary pressure and the secondary pressure of belt-type continuously variable transmission 6, etc. The CVT control unit 84 is configured to calculate a zero-point oil pressure command value based on the first parameter set and the second parameter set, wherein second clutch 5 starts to have a non-zero torque capacity at the zero-point oil pressure command value. This calculation is performed in the engagement hydraulic pressure control of second clutch 5, for example. The engagement hydraulic pressure control of second clutch 5 is executed by an engagement hydraulic pressure control section for second clutch 5 which is provided in CVT control unit 84, where a learning correction is performed to conform a second clutch oil pressure command value to the torque capacity of the second clutch. This second clutch learning correction control is described below.

Brake control unit 85 is configured to output a control command to brake fluid pressure control unit 17, based on input information from hybrid control module 81, a brake switch 98, a brake stroke sensor 99, etc. Brake control unit 85 is configured to perform the TCS control, the VDC control, the automatic brake control, the cooperative regenerative brake control, the ABS control, etc.

Lithium battery controller 86 is configured to manage the battery SOC, the battery temperature, etc., of high-power battery 21, based on input information from a battery voltage sensor 100, a battery temperature sensor 101, etc.

[Configuration of Process of Motor Idle Control]

Figure 2:
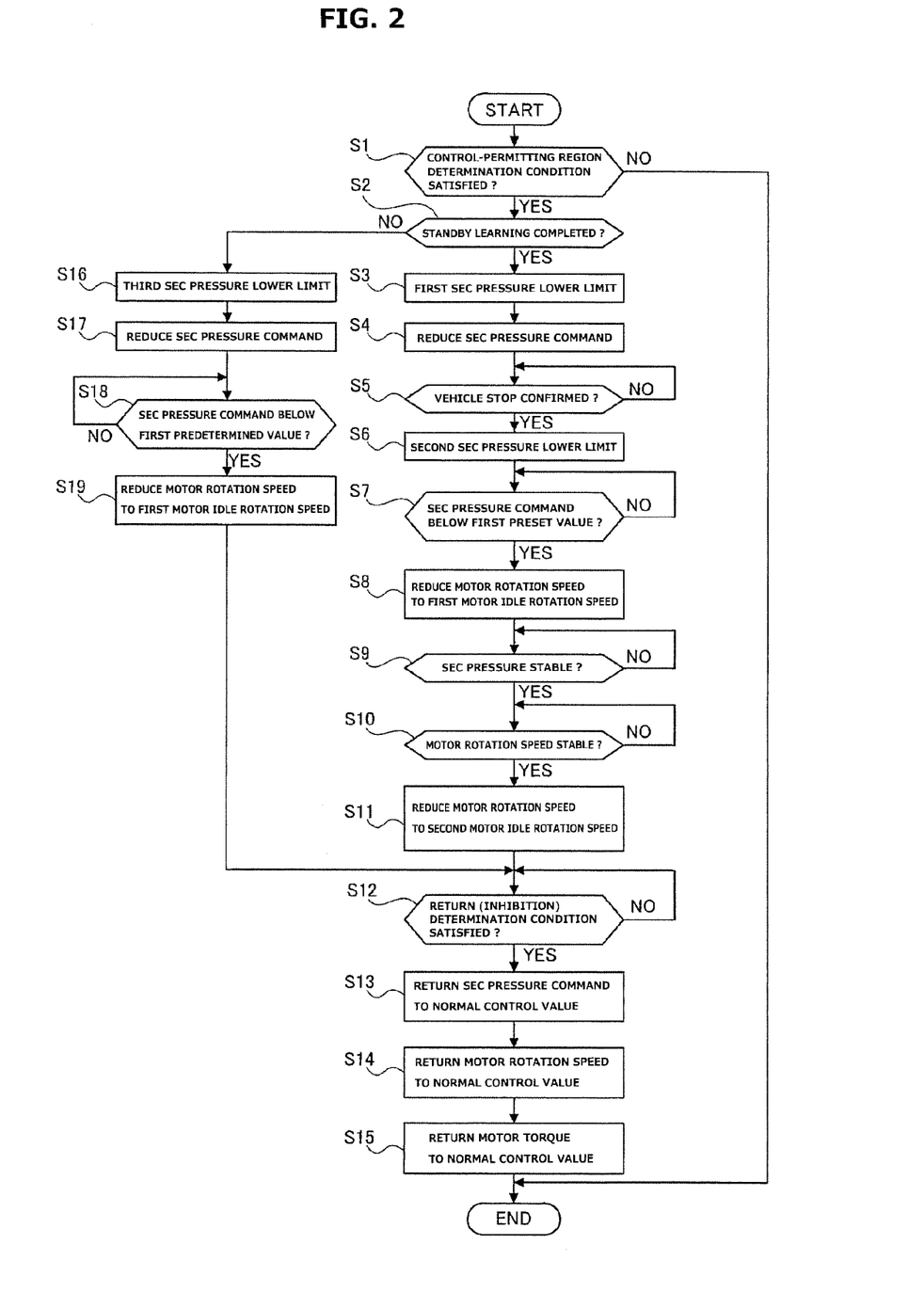
FIG. 2 is a flow chart showing a flow of a process of motor idle control, which is executed by a motor controller according to the first embodiment.

FIG. 2 shows a flow of a process of motor idle control during EV-mode vehicle stationary state, which is executed by motor controller 83 according to the first embodiment (motor idle control means). The following describes steps of FIG. 2 showing configuration of the process of motor idle control during EV-mode vehicle stationary state.

At Step S1, motor controller 83 determines whether or not a control-permitting region determination condition including a creep-cut condition requiring no creep torque of motor generator 4 is satisfied. In case of YES (the control-permitting region determination condition is satisfied), motor controller 83 proceeds to Step S2. In case of NO (the control-permitting region determination condition is unsatisfied), motor controller 83 proceeds to the end. The creep torque is a torque with which the vehicle starts to move in a motor idling state without depression of an accelerator pedal, wherein the creep torque is required to prevent the vehicle from moving down when the vehicle is stopped at a sloped road. The creep-cut condition is determined to be satisfied, when the vehicle is stationary, and a second clutch target torque TTCL2 obtained by feedforward control (FF control) is smaller than or equal to a predetermined value, and corresponds to a creep torque at a level road. The control-permitting region determination condition includes the following listed conditions in addition to the creep-cut condition:

(a) Selection of the D-range,
(b) Selection of the EV mode,
(c) Vehicle speed<Vehicle stop threshold value,
(d) Brake-on,
(e) Accelerator-off,
(f) ATF oil temperature<Designated temperature, and
(g) No determination of abnormality.

When all of the conditions (a) to (g) are satisfied, the control-permitting region determination condition is determined to be satisfied.

At Step S2, following the determination at Step S1 that the control-permitting region determination condition is satisfied, motor controller 83 determines whether or not a CL2 standby learning is completed. When the CL2 standby learning is completed, motor controller 83 proceeds to Step S3. The CL2 standby learning is described below. At Step S3, following the determination at Step S2 that the CL2 standby learning is completed, motor controller 83 sets a first secondary pressure lower limit Pmin1 that is a lower limit of the secondary pressure command value, and then proceeds to Step S4. At Step S4, motor controller 83 outputs a control command such that the secondary pressure command value for controlling a secondary pressure Psec supplied to secondary pulley 6b decreases toward a second secondary pressure lower limit Pmin2, and then proceeds to Step S5. At Step S5, motor controller 83 determines whether or not the state where the vehicle is stationary is confirmed after the determination that the vehicle is stationary. When it is confirmed, motor controller 83 proceeds to Step S6. The confirmation of the vehicle stationary state is implemented by determining whether or not a predetermined time period (vehicle stationary state confirmation time period) has elapsed after the determination of the vehicle stationary state, and determining that the state where the vehicle is stationary is confirmed, when the predetermined time period has elapsed. At Step S6, following the determination that the vehicle stationary state is confirmed, motor controller 83 sets the second secondary pressure lower limit Pmin2 that is a lower limit of the secondary pressure command value, and then proceeds to Step S7. The second secondary pressure lower limit Pmin2 (equal to a lower limit of line pressure) is set to such a pressure value (about 0.75 Mpa, for example) that no belt slip occurs when the creep cut is performed in a situation that the control-permitting region determination condition is satisfied after a vehicle stop in the EV-mode and the CL2 standby learning is completed.

At Step S7, motor controller 83 determines whether or not the secondary pressure command value becomes smaller than or equal to a first predetermined value, wherein the first predetermined value is greater than the second secondary pressure lower limit Pmin2 (about 0.75 Mpa, for example). In case of YES (the secondary pressure command value≤the first predetermined value), motor controller 83 proceeds to Step S8. In case of NO (the secondary pressure command value>the first predetermined value), motor controller 83 repeats the determination of Step S7. The first predetermined value is implemented by the first secondary pressure lower limit Pmin1 (about 1.1 Mpa, for example) corresponding to a lower limit of the secondary pressure until the vehicle stationary state is confirmed. This is because upon the determination of the vehicle stationary state, the secondary pressure lower limit is reduced by an offset between the secondary pressure command value and secondary pressure Psec, and is maintained (=first secondary pressure lower limit Pmin1) until the vehicle stationary state is confirmed.

At Step S8, following the determination at Step S7 of the secondary pressure command value≤the predetermined value, motor controller 83 outputs a command for reducing the motor rotational speed during the vehicle stationary state, to a first motor idle rotational speed Nma1, and then proceeds to Step S9. The first motor idle rotational speed Nma1 is a motor rotational speed (about 600 rpm, for example) required to generate belt-clamping pressures sufficient to prevent belt slip when the creep cut is performed with the CL2 standby learning uncompleted even when the vehicle is stationary in the EV mode and the control-permitting region determination condition is satisfied. Of controlled hydraulic pressures generated from a line pressure PL as an original pressure, the secondary pressure Psec is the highest one. Accordingly, in case of a single-side regulation type, the line pressure PL is used as secondary pressure Psec. Therefore, first motor idle rotational speed Nma1 may be regarded as a motor rotational speed required to generate secondary pressure Psec sufficient to prevent belt slip.

At Step S9, following Step S8 that the first motor idle rotational speed is commanded, motor controller 83 determines whether or not a condition for stability of secondary pressure Psec is satisfied. In case of YES (the condition for stability of secondary pressure Psec is satisfied), motor controller 83 proceeds to Step S10. In case of NO (the condition for stability of secondary pressure Psec is unsatisfied), motor controller 83 repeats the determination of Step S9. The condition for stability of secondary pressure Psec is determined to be satisfied in response to a condition where secondary pressure Psec reaches the second secondary pressure lower limit Pmin2, and is held at second secondary pressure lower limit Pmin2 for a predetermined time period.

At Step S10, following the determination at Step S9 that the condition for stability of Psec is satisfied, motor controller 83 determines whether or not a condition for stability of the motor rotational speed is satisfied. In case of YES (the condition for stability of the motor rotational speed is satisfied), motor controller 83 proceeds to Step S11. In case of NO (the condition for stability of the motor rotational speed is unsatisfied), motor controller 83 repeats the determination of Step S10. The condition for stability of the motor rotational speed is determined to be satisfied in response to a condition where the motor rotational speed reaches the first motor idle rotational speed Nma1, and is held at the first motor idle rotational speed Nma1 for a predetermined time period.

At Step S11, following the determination at Step S10 that the condition for stability of the motor rotational speed is satisfied, motor controller 83 reduces the motor rotational speed to a second motor idle rotational speed Nma2, and then proceeds to Step S12. The second motor idle rotational speed Nma2 is lower than the first motor idle rotational speed Nma1, and is a motor rotational speed (about 300 rpm, for example) required to generate the second secondary pressure lower limit Pmin2 (about 0.75 Mpa, for example). The motor rotational speed is reduced from the first motor idle rotational speed Nma1 to the second motor idle rotational speed Nma2 at a descending gradient such that the motor rotational speed decreases gradually with time.

At Step S12, following the reduction of the motor rotational speed at Step S11, motor controller 83 determines whether or not a condition for return (inhibition) determination is satisfied. In case of YES (the condition for return determination is satisfied), motor controller 83 proceeds to Step S13. In case of NO (the condition for return determination is unsatisfied), motor controller 83 repeats the determination of Step S12. The condition for return determination is set identical to the control-permitting region determination condition (a) to (g). If one of the conditions (a) to (g) is unsatisfied, the condition for return determination is determined to be satisfied.

At Step S13, following the determination at Step S12 that the condition for return determination is satisfied, motor controller 83 returns the secondary pressure command value to a normal control value, and then proceeds to Step S14. The normal control value is set based on the torque of the motor during the EV-mode vehicle stationary state.

At Step S14, following the return of the secondary pressure command value at Step S13, motor controller 83 returns the motor rotational speed, which has been lowered by the reduction of the motor rotational speed (=the second motor idle rotational speed Nma2), to a normal control value (=the first motor idle rotational speed Nma1), and then proceeds to Step S15.

At Step S15, following the return of the motor rotational speed at Step S14, motor controller 83 returns the motor torque, which has been reduced by the creep cut (=creep-cut torque Tmc_cut), to a normal control value (creep torque Tmc), and then proceeds to the end. The return from creep-cut torque Tmc_cut to creep torque Tmc is implemented by increasing the motor torque at an ascending gradient such that the motor torque increases gradually after a lapse of a waiting time period. When the CL2 standby learning is determined to be uncompleted at Step S2, motor controller 83 proceeds to Step S16. At Step S16, following the determination at Step S2 that the CL2 standby learning is uncompleted, motor controller 83 sets a third secondary pressure lower limit Pmin3 as a lower limit of the secondary pressure command value, and then proceeds to Step S17. At Step S17, motor controller 83 outputs a control command such that the secondary pressure command value for controlling the secondary pressure Psec supplied to secondary pulley 6b decreases toward the third secondary pressure lower limit Pmin3, and then proceeds to Step S18. The third secondary pressure lower limit Pmin3 (=lower limit of line pressure) is set to such a pressure value (about 1.6 Mpa, for example) that no belt slip occurs when the creep cut is performed in a situation that the control-permitting region determination condition is satisfied after a vehicle stop in the EV-mode and the CL2 standby learning is uncompleted. At Step S18, motor controller 83 determines whether or not the secondary pressure command value becomes smaller than or equal to a second predetermined value, wherein the second predetermined value is greater than the third secondary pressure lower limit Pmin3 (about 1.6 Mpa, for example). In case of YES (the secondary pressure command value ≤ the second predetermined value), motor controller 83 proceeds to Step S19. In case of NO (the secondary pressure command value > the second predetermined value), motor controller 83 repeats the determination of Step S18. The second predetermined value is set greater than the first secondary pressure lower limit Pmin1 (about 1.1 Mpa, for example) corresponding to the lower limit of the secondary pressure until the vehicle stationary state is confirmed. At Step S19, following the determination at Step S18 that the secondary pressure command value ≤ the second predetermined value, motor controller 83 outputs a command to reduce the motor rotational speed during the vehicle stationary state, to the first motor idle rotational speed Nma1, and then proceeds to Step S12.

The following describes actions of the control device for the FF hybrid vehicle according to the first embodiment, separately in sections [Action of Process of Motor Idle Control], [Action of Motor Idle Control], and [Characteristic Action of Motor Idle Control].

[Action of Process of Motor Idle Control] The following describes actions of the process of motor idle control with reference to the flow chart of FIG. 2. When the control-permitting region determination condition including creep-cut condition is satisfied and the CL2 standby learning is completed, the process proceeds as Step S1->Step S2->Step S3->Step S4->Step S5->Step S6->Step S7 in the flow chart of FIG. 2. At Step S2, it is determined whether or not the CL2 standby learning is completed. At Step S3, the first secondary pressure lower limit Pmin1 is set as a lower limit of the secondary pressure command value. At Step S4, a control command is outputted such that the secondary pressure command value for controlling the secondary pressure Psec supplied to secondary pulley 6b decreases toward the second secondary pressure lower limit Pmin2. At Step S5, it is determined whether or not the state where the vehicle is stationary is confirmed. At Step S6, the second secondary pressure lower limit Pmin2 is set which is a lower limit of the secondary pressure command value. At Step S7, it is determined whether or not the secondary pressure command value becomes smaller than or equal to the predetermined value. While it is determined that the secondary pressure command value > the predetermined value, the determination of Step S7 is repeated.

When it is determined at Step S7 that the secondary pressure command value becomes smaller than or equal to the first predetermined value, the process proceeds as Step S7->Step S8->Step S9 in the flow chart of FIG. 2. At Step S8, it outputs a command for reducing the motor rotational speed during the vehicle stationary state, to the first motor idle rotational speed Nma1 that is the normal control value during the motor idle control. At Step S9, it determines whether or not the condition for stability of secondary pressure Psec is satisfied. While the condition for stability of Psec is determined to be unsatisfied, the determination of Step S9 is repeated.

When the condition for stability of secondary pressure Psec is determined to be satisfied, the process proceeds from Step S9 to Step S10 in the flow chart of FIG. 2. At Step S10, it is determined whether or not the condition for stability of the motor rotational speed is satisfied. While it is determined that the condition for stability of the motor rotational speed is unsatisfied, the determination of Step S10 is repeated. When it is determined at Step S10 that the condition for stability of the motor rotational speed is satisfied, the process proceeds from Step S10 to Step S11 in the flow chart of FIG. 2. At Step S11, it reduces the motor rotational speed from the first motor idle rotational speed Nma1 to the second motor idle rotational speed Nma2 at the descending gradient such that the motor rotational speed decreases gradually with time. Simultaneously, at Step S11, the motor torque is reduced by the rotational speed control of the motor. Namely, when both of the condition for stability of the secondary pressure and the condition for stability of the motor rotational speed are satisfied, the motor idle rotational speed is reduced to reduce the motor torque. The foregoing describes the process of control entry for starting the motor idle control. During the motor idle control where the condition for return determination is determined to be unsatisfied at Step S12, the second motor idle rotational speed Nma2 and the creep-cut torque Tmc_cut are maintained.

At Step S12, it is determined whether or not the condition for return determination is satisfied. While the condition for return determination is unsatisfied, the determination of Step S12 is repeated. When it is determined at Step S12 that the condition for return determination is satisfied, the process proceeds as Step S12->Step S13->Step S14->Step S15->the end in the flow chart of FIG. 2. At Step S13, the secondary pressure command value is returned to the normal control value. At Step S14, the motor rotational speed, which has been lowered by the reduction of the motor rotational speed, is returned to the normal control value. At Step S15, the motor torque, which has been reduced as creep-cut torque Tmc_cut, is returned to creep torque Tmc as the normal control value, which is implemented by increasing the motor torque at the ascending gradient such that the motor torque increases gradually after a lapse of the waiting time period. The foregoing describes the process of control exit for cancelling the motor idle control. If at least one of the conditions (a) to (g) is unsatisfied, the condition for return determination is determined to be satisfied so that it returns to the normal motor idle control.

[Action of Motor Idle Control] First, during conception of a motor idle control targeted for optimizing and lowering an idle rotational speed, the following listed issues are abstracted from the vehicle of the invention and others.
(1) To inhibit low-speed rotation in a region where an estimated temperature of CL2 is high,
(2) To inhibit low-speed rotation when the vehicle is stationary with a high-position transmission ratio (to fix the low-position transmission ratio mechanically during low-speed rotation),
(3) To inhibit low-speed rotation, except for level ground,
(4) To inhibit low-speed rotation, when no actual line pressure is generated,
(5) To prevent the influence of standby learning,
(6) To prevent a select control from being influenced,
(7) To prevent shortage of the capacity due to degradation of response of oil pressure, at the time of return, and
(8) To raise the rotational speed of the oil pump in a region where the balance of oil quantity is short when the vehicle is stationary.

The issues (1) to (8) are addressed by the following (1) to (8) which forms the motor idle control proposed in the present application.
(1) To permit lowed-speed rotation, when the estimated temperature of CL2 is lower than or equal to a predetermined value.
(2) To permit lowered-speed rotation, when the transmission ratio when the vehicle is stationary is higher than a predetermined transmission ratio. During low-speed rotation, the secondary pressure of the lower limit is obtained by reduction of balance thrust ratio, so that the low-position transmission ratio cannot be fixed mechanically, but no stroke is present because of no rotation.
(3) To permit lowered-speed rotation, assuming a ground of ± several % as a level ground.
(4) To monitor actual secondary pressure during low-speed rotation, and cancel low-speed rotation immediately when the actual secondary pressure becomes lower by a predetermined pressure than the secondary pressure lower limit.
(5) To permit low-speed rotation lowered to second motor idle rotational speed Nma2 only after standby learning (after determination of convergence).
(6) To inhibit lowered-speed rotation during select control.
(7) To request a torque reduction during low-speed rotation. At cancellation, it is made possible to set a delay of time of return of oil pressure and a rate of return in an axis of temperature.
(8) To request lower-limit rotation depending on oil temperature and pressure command value.

Figure 3:
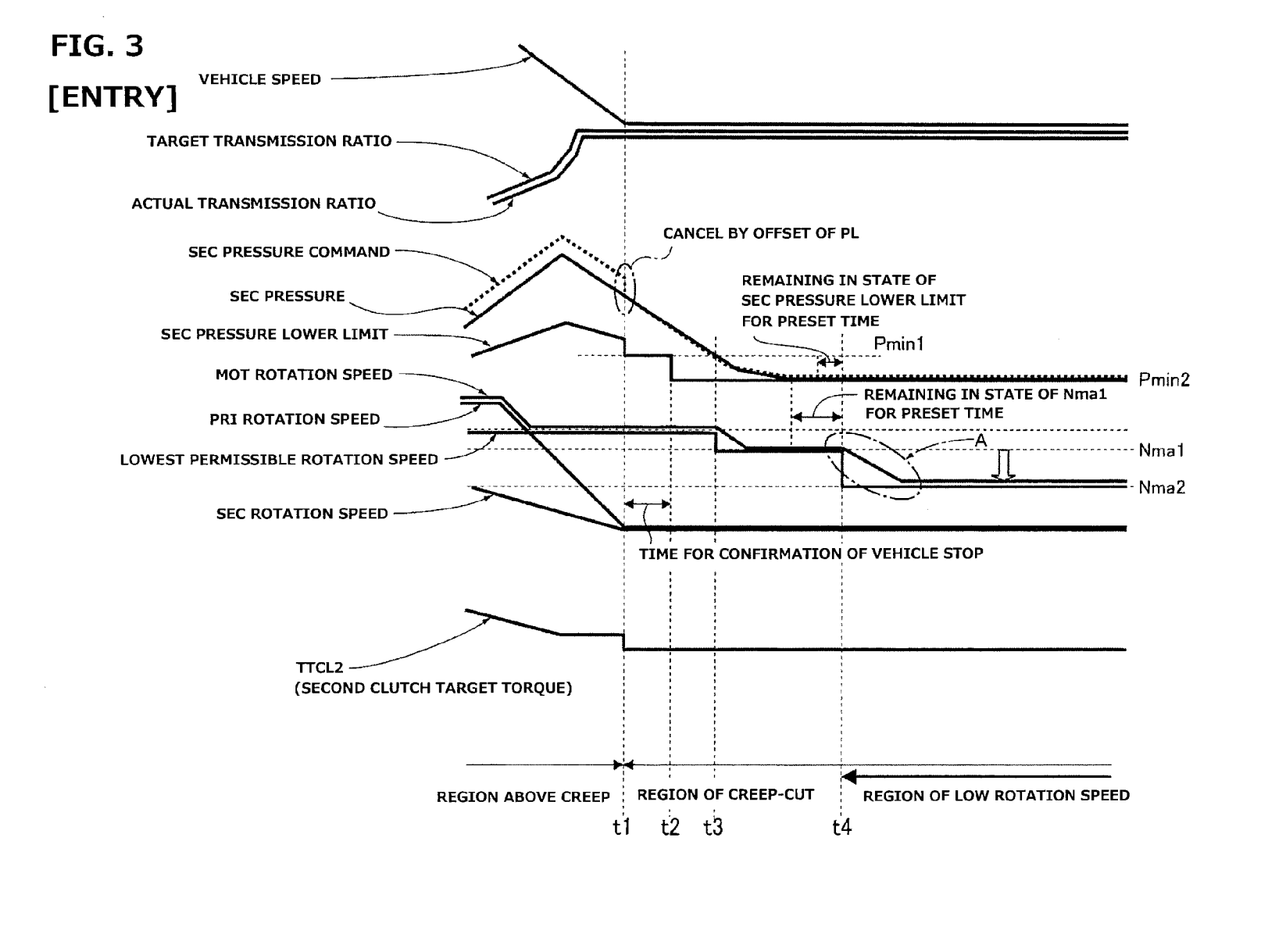
FIG. 3 is a time chart for control entry, showing characteristics of a vehicle speed, a target transmission ratio, an actual transmission ratio, a secondary pressure command value, a secondary pressure, a secondary pressure lower limit, a motor rotational speed, a primary rotational speed, a lowest permissible rotational speed, a secondary rotational speed, a motor torque, and a second clutch target torque, in a situation of control entry where the motor idle control is started when the FF hybrid vehicle according to the first embodiment is stationary with an EV mode selected.

The following describes actions of control entry of the motor idle control with reference to the time chart for control entry shown in FIG. 3. In FIG. 3, a time instant t1 is a time instant when the vehicle becomes stationary. A time instant t2 is a time instant when the stationary state of the vehicle is confirmed. A time instant t3 is a time instant when the motor rotational speed is reduced. A time instant t4 is a time instant when the motor rotational speed is reduced.

The region where the vehicle runs under deceleration by release of the accelerator, and then becomes stationary at time instant t1, is a region above creeping. As time approaches time instant t1, the target transmission ratio and the actual transmission ratio shift to the lowest-position transmission ratio so that the vehicle becomes stationary with the lowest-position transmission ratio maintained. In this situation, the secondary pressure command value, the secondary pressure Psec, and the secondary pressure lower limit increase in advance to shifting to the lowest-position transmission ratio, and as the lowest-position transmission ratio is maintained, the secondary pressure command value, the secondary pressure Psec, and the secondary pressure lower limit decrease. The primary rotational speed and the secondary rotational speed of belt-type continuously variable transmission 6 become zero (stationary) toward time instant t1 as the vehicle speed decreases. The second clutch target torque TTCL2 decreases while the secondary pressure command value increases, and is maintained constant when the secondary pressure command value decreases.

When the control-permitting region determination condition is satisfied with the CL2 standby learning completed during the vehicle stationary state at time instant t1, a control command is outputted to cancel or reduce the secondary pressure command value by the offset of line pressure PL, and thereafter reduce the secondary pressure command value toward the second secondary pressure lower limit Pmin2. At time instant t1, the cancellation of the secondary pressure command value based on the offset of PL causes the secondary pressure lower limit to decrease to the first secondary pressure lower limit Pmin1, and also causes the second clutch target torque TTCL2 from a target torque before the vehicle becomes stationary. When the vehicle stationary state is confirmed after awaiting a lapse of the period from time instant t1 to time instant t2, the secondary pressure lower limit is reduced from the first secondary pressure lower limit Pmin1 to the second secondary pressure lower limit Pmin2.

When it is determined at time instant t3 that the decreasing secondary pressure command value becomes lower than or equal to the predetermined value (=first secondary pressure lower limit Pmin1), the motor rotational speed during the period during the vehicle stationary state from time instant t1 to time instant t3 is reduced to the first motor idle rotational speed Nma1, which is the normal control value in the motor idle control, at the predetermined descending gradient.

After time instant t3, it determines whether or not the condition for stability of secondary pressure Psec is satisfied and whether or not the condition for stability of the motor rotational speed is satisfied. At time instant t4 when both of the condition for stability of secondary pressure Psec and the condition for stability of the motor rotational speed are satisfied, the motor rotational speed is reduced at the descending gradient from the first motor idle rotational speed Nma1 to the second motor idle rotational speed Nma2 gradually with time (characteristics of the motor rotational speed in an area encompassed and indicated by an arrow A). Since the motor is controlled by rotational speed control, the motor torque decreases as the rotational speed decreases. Namely, in the region after time instant t4, the motor idle rotational speed is reduced to a low speed range, and the motor torque is also reduced.

Figure 4:
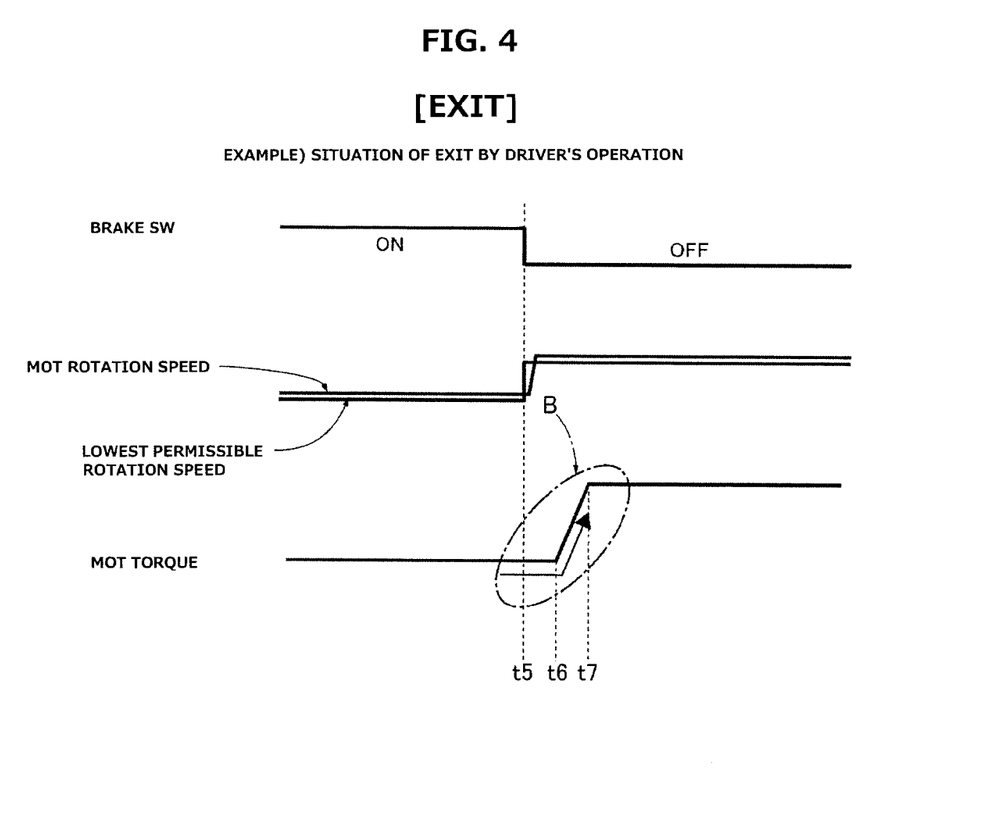
FIG. 4 is a time chart for control exit, showing characteristics of a brake switch, an accelerator opening, a range position, the secondary pressure command value, the secondary pressure lower limit, the motor rotational speed, the lowest permissible rotational speed, the motor torque, and the second clutch target torque, in a situation of control exit where the motor idle control when the FF hybrid vehicle according to the first embodiment is stationary with the EV mode selected is cancelled.

The following describes actions of control exit of the motor idle control with reference to the time chart for control exit shown in FIG. 4. In FIG. 4, a time instant t5 is a time instant when the condition for return determination is satisfied. A time instant t6 is a time instant when the return of the motor torque is started. A time instant t7 is a time instant when the return of the motor torque is completed.

When one of brake-release operation, accelerator depressing operation, and select operation of shifting the range position from the D-range to another range is performed, the condition for return determination is satisfied. For example, when the return determination condition is satisfied by brake-release operation at time instant t5, the secondary pressure command value is returned to the normal control value as the secondary pressure lower limit increases. Furthermore, the motor rotational speed, which has been lowered by the reduction of the motor rotational speed (=the second motor idle rotational speed Nma2), is returned to the normal control value (=the first motor idle rotational speed Nma1) as the lowest permissible rotational speed increases. During the waiting period from time instant t5 to time instant t6, the motor torque is maintained, but at time instant t6, the motor torque is returned from the creep-cut torque Tmc_cut, which is a reduced torque by the torque reduction, to creep torque Tmc as the normal control value, at the ascending gradient so that the motor torque increases gradually after the lapse of the waiting period until time instant t7 (characteristics of the motor torque in an area encompassed and indicated by an arrow B). In this way, when at least one of the control-permitting region determination conditions (a) to (g) including the condition of driver operation and the environmental condition is unsatisfied, the return determination condition is determined to be satisfied so that it returns to the normal motor idle control.

[Characteristic Action of Motor Idle Control] The first embodiment is configured to reduce the rotational speed of motor generator 4 to the second motor idle rotational speed Nma2 in response to a condition that the vehicle is stationary with the EV mode selected, the creep-cut condition requiring no creep torque of motor generator 4 is satisfied, and the CL2 standby learning is completed, wherein the second motor idle rotational speed Nma2 is lower than the first motor idle rotational speed Nma1. The reduction from the first motor idle rotational speed Nma1 of the normal control to the second motor idle rotational speed Nma2 serves to suppress power consumption of the motor during the motor idle control by the differential rotational speed. This serves to suppress the state of charge of high-power battery 21 for power supply to the motor from being reduced. The suppression of reduction of the state of charge of the battery serves to shorten a time period when an engine generation mode is selected to charge the high-power battery 21 by driving the motor generator 4 by transversely mounted engine 2, as compared to a condition that the normal motor idle control is performed based on the first motor idle rotational speed Nma1. This serves to suppress power consumption of motor generator 4 when the vehicle is stationary with the EV mode selected, and thereby enhance the mode fuel efficiency.

The first embodiment is configured to set the second secondary pressure lower limit Pmin2 having a pressure value sufficient to prevent belt slip when the creep cut is performed under a condition that the control-permitting region determination condition is satisfied after the EV-mode vehicle stop, and the CL2 standby learning is completed. The first embodiment is further configured to set the second motor idle rotational speed Nma2 to a motor rotational speed required to generate the second secondary pressure lower limit Pmin2. Since the torque inputted through the second clutch 5 is stable during low-speed operation based on the second motor idle rotational speed Nma2 because of the completion of the CL2 standby learning, it is possible to achieve the second secondary pressure lower limit Pmin2 sufficient to prevent belt slip.

The first embodiment is configured to determine that the creep-cut condition is satisfied, in response to a condition that the vehicle is stationary, and the second clutch target torque TTCL2 obtained by FF control is smaller than or equal to the predetermined value. For example, if the creep-cut condition is determined based on the target torque capacity of CL2 after feedback control (FB control), and second clutch 5 remains at the engaged side during the FB control, then the creep-cut condition is not satisfied when the vehicle is stationary. In contrast, the feature that the determination whether the creep-cut condition is satisfied or unsatisfied is implemented by using the second clutch target torque TTCL2 obtained by FF control, serves to accurately determine whether the creep-cut condition is satisfied.

The first embodiment is configured to control the motor by rotational speed control, and cause the torque of motor generator 4 to decrease as the motor idle rotational speed is reduced. If the capacity of second clutch 5 is constant when the motor idle rotational speed is reduced, the torque required to maintain the rotational speed of the motor becomes small, thereby suppressing the power consumption of motor generator 4 while the vehicle is stationary with the EV mode selected, and enhancing the mode fuel efficiency.

The first embodiment is configured to reduce the secondary pressure command value toward the second secondary pressure lower limit Pmin2 in response to a satisfaction of the creep-cut condition when the vehicle is stationary with the EV mode selected. The first embodiment is further configured to reduce the vehicle-stationary-state motor rotational speed to the first motor idle rotational speed Nma1 in response to a condition that the secondary pressure command value reaches the first secondary pressure lower limit Pmin1 higher than the second secondary pressure lower limit Pmin2. For example, if the motor rotational speed is immediately reduced to the first motor idle rotational speed Nma1 when the vehicle is stationary, it is possible that the balance of oil quantity becomes short to cause the belt to slip or so. In contrast, the feature that the reduction of the motor rotational speed is performed after the confirmation that secondary pressure Psec is reduced sufficiently, serves to achieve the reduction of the motor rotational speed to the first motor idle rotational speed Nma1 with suppressing shortage of the balance of oil quantity, after the vehicle becomes stationary.

The first embodiment is configured to start to reduce the motor rotational speed in the timing when the condition for stability of oil pressure where the secondary pressure command value remains at the second secondary pressure lower limit Pmin2 is satisfied, and the condition for stability of the motor rotational speed where the motor rotational speed remains at the first motor idle rotational speed Nma1 is satisfied. For example, if the motor rotational speed starts to be reduced in a timing when at least one of the condition for oil pressure stability and the condition for rotational speed stability is unsatisfied, it is possible that the balance of oil quantity becomes short to cause the belt to slip or so. In contrast, the feature that the reduction of the motor rotational speed is performed in the timing when both of the condition for oil pressure stability and the condition for rotational speed stability are satisfied, serves to achieve the reduction of the motor rotational speed while suppressing shortage of the balance of oil quantity, after the vehicle becomes stationary.

The first embodiment is configured to reduce the motor rotational speed from the first motor idle rotational speed Nma1 to the second motor idle rotational speed Nma2 at the descending gradient such that the motor rotational speed decreases gradually with time. For example, if the motor rotational speed is reduced from the first motor idle rotational speed Nma1 to the second motor idle rotational speed Nma2 in a stepwise manner, it is possible that the pump discharge quantity of main oil pump 14 decreases rapidly, to cause the actual secondary pressure to undershoot. In contrast, the feature of providing the motor rotational speed with the descending gradient serves to achieve the reduction of the motor rotational speed to the second motor idle rotational speed Nma2 without causing the actual secondary pressure to undershoot. Since the descending gradient depends on the temperature-sensitivity determining the response of oil pressure, it is preferable that the descending gradient is set variably depending on ATF oil temperature, for example, in a manner that the descending gradient becomes mild as ATF oil temperature decreases.

The first embodiment is configured to return the secondary pressure command value and the motor rotational speed to the normal control values, and return the motor torque at the ascending gradient such that the motor torque increases gradually after the waiting time period (from time instant t5 to time instant t6) has elapsed, in response to a satisfaction of the condition for return from the motor idle control. For example, if the motor torque, which is a driving torque in the EV mode, is increased immediately when the return condition becomes satisfied, it is possible that a delay in response of oil pressure with respect to response of the motor torque causes shortage of the balance of oil quantity, and thereby causes belt slip and others. In contrast, the feature that the gradual increase of the motor torque is performed after the rise and return of secondary pressure Psec is awaited, serves to achieve the increase of the motor torque with suppressing shortage of the balance of oil quantity, during the return from the motor idle control. It is preferable to set the waiting time period and the ascending gradient variable based on the ATF oil temperature, because they depend on the temperature-sensitivity determining the response of oil pressure.

Figure 5:
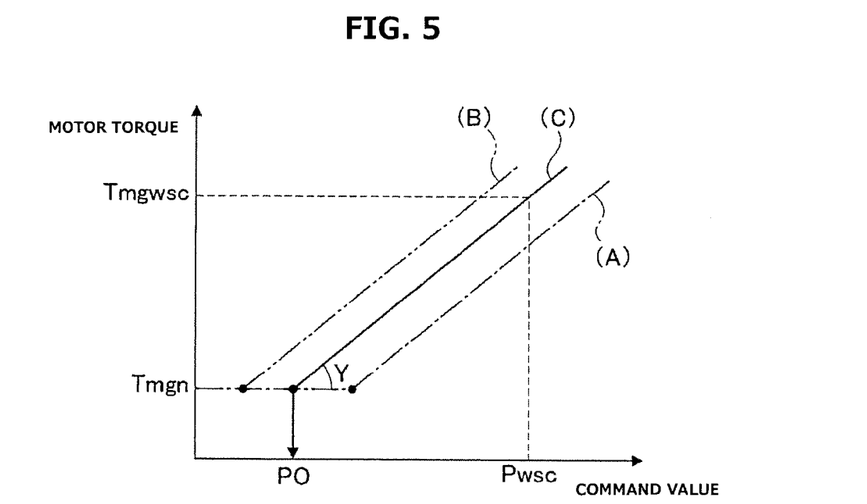
FIG. 5 is a characteristic diagram showing a relationship between a second clutch oil pressure command value and a motor torque value in the first embodiment.

<Process of Second Clutch Learning Correction Control: CL2 Standby Learning>The following describes a process of second clutch learning correction control (CL2 standby learning) for correcting, by learning, a relationship between the second clutch oil pressure command value for second clutch 5 and the second clutch torque capacity produced actually by second clutch 5. As described above, in the WSC mode, second clutch 5 is slip-controlled. If the relationship between the second clutch oil pressure command value for second clutch 5 and the second clutch torque capacity produced actually by second clutch 5 (henceforth referred to as second clutch torque capacity characteristic) has an error, it is impossible to transmit a suitable torque to the driving wheels, and thereby obtain desired driving performance. FIG. 5 is a characteristic diagram showing a relationship between the second clutch oil pressure command value and the motor torque value. The characteristic of change of the motor torque value is identical to that of the second clutch torque capacity when second clutch 5 has a non-zero torque capacity, and is therefore assumed to substantially represent the relationship between the second clutch oil pressure command value and the second clutch torque capacity in the following description. In FIG. 5, (C) represents a relationship between the command value and the torque capacity actually generated. In FIG. 5, (A) represents an initial characteristic for a case where it is recognized that a desired torque capacity can be generated based on a smaller command value. In FIG. 5, (B) represents an initial characteristic for a case where it is recognized that a desired torque capacity can be generated based on a greater command value. P0 represents an actual second clutch oil pressure command value at a zero-point.

For example, if a command value corresponding to the zero-point is outputted based on the recognition of the characteristic (A), the command value is higher than P0. This causes a larger torque capacity of the second clutch (because the actual characteristic is of (C)), and thereby causes an excessive driving torque to be outputted. On the other hand, if a command value corresponding to the zero-point is outputted based on the recognition of the characteristic (B), the command value is lower than P0. This causes a smaller torque capacity of the second clutch (or the zero-point cannot be reached), and thereby adversely affects the responsiveness. It is assumed that the characteristic of the second clutch torque capacity deviates due to an individual error or a secular change. It is very important to correct the zero-point that is a point where second clutch 5 starts to have a non-zero torque capacity, because it influences the response of vehicle start and the durability. Accordingly, the first embodiment is configured to early calculate the second clutch oil pressure command value at the zero-point.

The torque capacity of second clutch 5 is expressed by equation (1).

$$TCL2 = \mu \cdot 2N \cdot D/2 \cdot (P \cdot A - F)/i = \mu \cdot N \cdot D \cdot (P \cdot A - F)/i \qquad \text{<Equation (1)>}$$

where
μ: the frictional coefficient of the clutch,
N: the number of drive plates,
D: the diameter of the second clutch,
P: the oil pressure of the second clutch,
A: the pressure-receiving area of the oil pressure of the second clutch,
F: a reaction force of a return spring, and
i: a planetary gear ratio.

Where second zero-point oil pressure command value P0 represents a clutch oil pressure with which TCL2=0 (second clutch oil pressure at zero-point), equation (2) is established.

$$F = P0 \cdot A \qquad \text{<Equation (2)>}$$

Substituting the equation (2) into equation (1) yields equation (3).

$$P0 = P - Tc/(\mu \cdot N \cdot D \cdot A/i) \qquad \text{<Equation (3)>}$$

The equation of balance of motor generator MG is expressed by equation (4) or (5), where Tmgwsc represents a motor torque in the WSC state, and Tmgn represents a motor torque in a neutral state (henceforth referred to as N-state) where second clutch 5 is completely disengaged.

$$Tmgwsc = Tfric\_mg + TCL2 + Tfric\_op \qquad \text{<Equation (4) for the WSC state>}$$

$$Tmgn = Tfric\_mg + Tfric\_op \qquad \text{<Equation (5) for the N-state>}$$

where
Tfric_mg: the friction of the motor, and
Tfric_op: the fiction of the mechanical oil pump.

From equations (4) and (5), equation (6) is obtained for expressing TCL2.

$$TCL2 = Tmgwsc - Tmgn \qquad \text{<Equation (6)>}$$

Substituting the equation (6) into equation (3) yields equation (7), where Pwsc represents a second clutch oil pressure command value when in the WSC state.

$$P0 = Pwsc - (Tmgwsc - Tmgn)/(\mu \cdot N \cdot D \cdot A/i) \qquad \text{<Equation (7)>}$$

Where (μ·N·D·A/i)=Y, Y is a constant which is determined by specifications of the vehicle. Accordingly, as shown in equation (7), second zero-point oil pressure command value P0 at the zero-point can be calculated from second clutch oil pressure command value Pwsc in the WSC state, and the corresponding motor torque Tmgwsc, and motor torque Tmgn obtained in the N-state. In other words, as shown by the characteristic (C) in FIG. 5, the gradient of the characteristic is defined by Y, so that the characteristic can be determined by the motor torque Tmgwsc corresponding to Pwsc. With reference to this characteristic, the command value corresponding to Tmgn is equal to second zero-point oil pressure command value P0 at the zero-point, where second zero-point oil pressure command value P0 can be inversely calculated instantaneously. The motor torque value can be instantaneously and precisely calculated from the motor current value or the like, so that it takes only a short time period to obtain the parameter set including Tmgwsc and Tmgn. This serves to increase the frequency of obtaining the parameter set, and thereby increase the frequency of learning.

Figure 6:
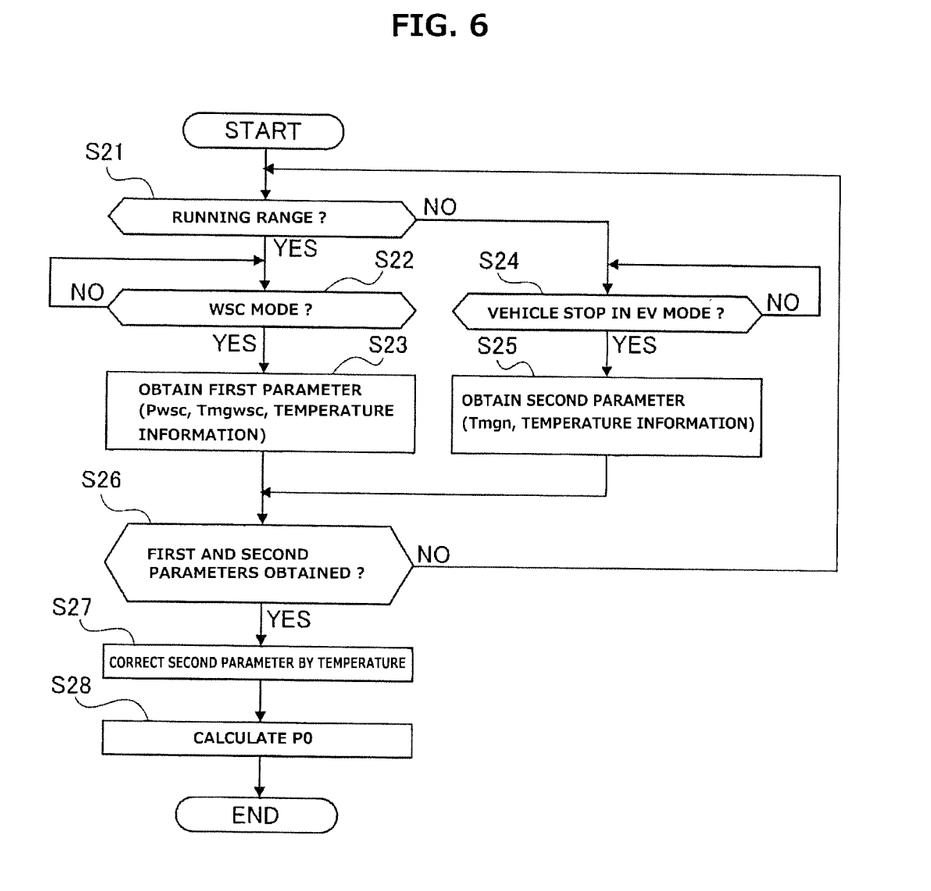
FIG. 6 is a flow chart showing a second clutch learning correction control in the first embodiment.

FIG. 6 is a flow chart showing a second clutch learning correction control according to the first embodiment. At Step S21, it determines whether or not the running range (D-range, R-range) is selected. In case of the running range, it proceeds to Step S22. In case of non-running range (N-range, P-range), it proceeds to Step S24. At Step S22, it determines whether or not the WSC mode is selected. In case of the WSC mode, it proceeds to Step S23. Otherwise, it repeats Step S22. At Step S23, it obtains a second clutch temperature temp_wsc, Pwsc, Tmgwsc (these pieces of information are henceforth referred to as a first parameter set).

At Step S24, it determines whether or not the EV mode is selected and the vehicle is stationary with brake-on (referred to as non-running-range learning condition). When the non-running-range learning condition is satisfied, it proceeds to Step S25. Otherwise, it repeats Step S24. At Step S25, it obtains second clutch temperature temp_n, and Tmgn when motor generate MG is rotated with second clutch 5 completely disengaged (these pieces of information are henceforth referred to as a second parameter set).

At Step S26, it determines whether or not both of the first and second parameter sets have been already obtained. When they have been already obtained, it proceeds to Step S27. Otherwise, it returns to Step S21. At Step S27, it calculates a correction quantity of Tmgn based on the difference between temp_wsc and temp_n, and then corrects Tmgn. At Step S28, it calculates P0 based on Pwsc, Tmgwsc, and the corrected Tmgn.

The following describes effects. The control device for the FF hybrid vehicle according to the first embodiment produces the following listed effects.

<1> A hybrid vehicle control device for a hybrid vehicle (FF hybrid vehicle), wherein: the hybrid vehicle (FF hybrid vehicle) includes a driveline, wherein the driveline includes an engine (2), a motor (motor generator 4), a hydraulically-controlled transmission (belt-type continuously variable transmission 6), and a friction clutch (second clutch 5), wherein the friction clutch (second clutch 5) is disposed in a driving force transmission line between the motor (motor generator 4) and a driving wheel (left and right front wheels 10L, 10R); the belt-type continuously variable transmission includes a primary pulley (6a), a secondary pulley (6b), and a belt (6c), wherein the belt (6c) is wound over the primary pulley (6a) and the secondary pulley (6b), and configured to be clamped by a primary pulley pressure as a belt-clamping pressure at the primary pulley (6a) and a secondary pulley pressure as a belt-clamping pressure at the secondary pulley (6b); and the hybrid vehicle (FF hybrid vehicle) employs an EV mode as a drive mode, and is configured to supply a discharge oil of an oil pump (14) as the belt-clamping pressures when the EV mode is selected, wherein the EV mode employs the motor (motor generator 4) as a drive source without employing another drive source, and wherein the oil pump (main oil pump 14) is configured to be driven by the motor (motor generator 4); the hybrid vehicle control device includes: motor controller 83 (obtaining means) configured to obtain a parameter set including at least a value of torque of the motor (motor generator 4) (motor torque value), specifically, motor controller 83 (obtaining means) including Step S23 (first obtaining means) and Step S25 (second obtaining means), wherein Step S23 (first obtaining means) is configured to obtain a first parameter set including at least Tmgwsc (first motor torque value) that is a value of torque of motor generator MG when a running range is selected, and wherein Step S25 (second obtaining means) is configured to obtain a second parameter set including at least Tmgn (second motor torque value) that is a value of torque of motor generator MG when a non-running range is selected; Step S28 (standby learning control means) configured to learn a zero-point oil pressure command value (P0) based on the parameter set (the first parameter set and the second parameter set), wherein the friction clutch (second clutch 5) starts to have a non-zero torque capacity at the zero-point oil pressure command value (P0); and a motor idle control means (motor controller 83) configured to control rotational speed of the motor (motor generator 4) to a first motor idle rotational speed (Nma1), in response to a satisfaction of a creep-cut condition requiring no creep torque of the motor (motor generator 4) when the hybrid vehicle is stationary with the EV mode selected; wherein the motor idle control means (motor controller 83, FIG. 2) is further configured to reduce the rotational speed of the motor (motor generator 4) to a second motor idle rotational speed (Nma2), in response to a completion of the learning of the zero-point oil pressure command value (P0) by the standby learning control means, wherein the second motor idle rotational speed (Nma2) is lower than the first motor idle rotational speed (Nma1). This serves to suppress power consumption of the motor (motor generator 4), and thereby enhance the mode fuel efficiency.

<2> The hybrid vehicle control device is further configured such that the motor idle control means (motor controller 83, FIG. 2) is further configured to: set a lower limit of line pressure (second secondary pressure lower limit Pmin2) with which the belt-clamping pressures are sufficient to prevent the belt (6c) from slipping due to a torque inputted during motor idle control; and set the second motor idle rotational speed (Nma2) to a motor rotational speed required to produce the line pressure of the lower limit (second secondary pressure lower limit Pmin2) with which the belt (6c) is prevented from slipping due to an input torque after the completion of the learning of the zero-point oil pressure command value (P0). This serves to suppress bel slip more reliably during the motor idle control, while achieving reduction of the motor idle rotational speed, in addition to the effect of <1>.

<3> The hybrid vehicle control device, wherein the friction clutch (second clutch 5) is disposed in the driving force transmission line between the motor (motor generator 4) and the driving wheel (left and right front wheels 10L, 10R), is further configured such that the motor idle control means (motor controller 83, FIG. 2) is further configured to determine that the creep-cut condition is satisfied, in response to a condition that the hybrid vehicle is stationary and a target torque of the friction clutch (second clutch target torque TTCL2) obtained by feedforward control (FF control) is smaller than or equal to a predetermined value. This serves to accurately determine a satisfaction of the creep-cut condition by employing the target torque of the friction clutch (second clutch target torque TTCL2) for determining the creep-cut condition, in addition to the effect of <1> or <2>.

<4> The hybrid vehicle control device is further configured such that the motor idle control means (motor controller 83, FIG. 2) is further configured to reduce a target motor idle rotational speed by a rotational speed control configured to control the rotational speed of the motor (motor generator 4). This serves to suppress power consumption of the motor (motor generator 4), and thereby enhance the mode fuel efficiency, while suppressing the friction clutch (second clutch 5) from slipping, in addition to the effect of <3>.

<5> The hybrid vehicle control device, wherein the transmission is the belt-type continuously variable transmission (6) including the primary pulley (6a), the secondary pulley (6b), and the belt (6c), wherein the belt (6c) is wound over the primary pulley (6a) and the secondary pulley (6b), and configured to employ the primary pulley pressure (Ppri) and the secondary pressure (Psec) as shifting oil pressures, is further configured such that: the motor idle control means (motor controller 83, FIG. 2) is further configured to perform a first operation in response to a satisfaction of the creep-cut condition when the hybrid vehicle is stationary with the EV mode selected; and the first operation is configured to: reduce a secondary pressure command value toward a secondary pressure lower limit (second secondary pressure lower limit Pmin2); and reduce the rotational speed of the motor when the hybrid vehicle is stationary, to the first motor idle rotational speed (Nma1), in response to a condition that the secondary pressure command value has reached a predetermined value (first secondary pressure lower limit Pmin1) higher than the secondary pressure lower limit (second secondary pressure lower limit Pmin2). This serves to achieve the reduction of the motor rotational speed from the vehicle stationary state motor rotational speed to the first motor idle rotational speed Nma1, while suppressing shortage of the balance of oil quantity, after the vehicle becomes stationary, in addition to the effect of <1> to <4>.

<6> The hybrid vehicle control device is further configured such that: the motor idle control means (motor controller 83, FIG. 2) is further configured to start to reduce the rotational speed of the motor and the torque of the motor in a timing when an oil pressure stability condition and a rotational speed stability condition are satisfied; the oil pressure stability condition is a condition where the secondary pressure command value is held at the secondary pressure lower limit (second secondary pressure lower limit Pmin2); and wherein the rotational speed stability condition is a condition where the rotational speed of the motor is held at the first motor idle rotational speed (Nma1). This serves to achieve the reduction of the motor rotational speed and the reduction of the motor torque, while suppressing shortage of the balance of oil quantity, in addition to the effect of <5>.

<7> The hybrid vehicle control device is further configured such that the motor idle control means (motor controller 83, FIG. 2) is further configured to reduce the rotational speed of the motor from the first motor idle rotational speed (Nma1) to the second motor idle rotational speed (Nma2) at a descending gradient with which the rotational speed of the motor decreases gradually with time. This serves to achieve the reduction of the motor rotational speed to the second motor idle rotational speed (Nma2), while preventing the actual secondary pressure from undershooting, in addition to the effect of <6>.

<8> The hybrid vehicle control device is further configured such that: the motor idle control means (motor controller 83, FIG. 2) is further configured to perform a second operation in response to a satisfaction of a condition for return from motor idle control; the second operation is configured to: return the secondary pressure command value and the rotational speed of the motor (4) to normal control values; and cause the torque of the motor to increase at an ascending gradient such that the torque of the motor increases gradually after a waiting time period (time instant t5 to time instant t6) has elapsed. This serves to achieve the increase of the motor torque, with suppressing shortage of the balance of oil quantity, when returning from the motor idle control, in addition to the effect of <5> to <7>.

Although the hybrid vehicle control device according to the present invention has been described with reference to the first embodiment as described above, specific configuration of the present invention is not limited to the first embodiment, but may be carried out with design modification and addition without going out of the substance of the present invention related to the present claims.

The first embodiment has the exemplified configuration that the transmission is implemented by belt-type continuously variable transmission 6 where belt 6c is wound over the primary pulley 6a and secondary pulley 6b, and primary pulley pressure Ppri and secondary pressure Psec are oil pressures for shifting. However, the transmission may be implemented by a stepwise-speed transmission providing a plurality of shift positions.

The first embodiment has the exemplified configuration where the control device according to the present invention is applied to the FF hybrid vehicle. However, the control device according to the present invention may be applied to FR hybrid vehicles. Moreover, the control device may applied to hybrid vehicles of a drive type other than the one-motor and two-clutches drive type where the EV mode is employed based on a drive distribution mechanism or the like. In summary, the control device according to the present invention may be applied to any hybrid vehicle which includes an engine and a motor and a hydraulically-controlled transmission in a driveline, and employs an EV mode as a drive mode, and is configured to control a line pressure based on discharge oil of an oil pump driven by the motor.

The invention claimed is:

1. A hybrid vehicle control device for a hybrid vehicle, wherein:
   the hybrid vehicle includes a driveline, wherein the driveline includes an engine, a motor, a belt-type continuously variable transmission, and a friction clutch, wherein the belt-type continuously variable transmission is configured to be controlled hydraulically, and wherein the friction clutch is disposed in a driving force transmission line between the motor and a driving wheel;
   the belt-type continuously variable transmission includes a primary pulley, a secondary pulley, and a belt, wherein the belt is wound over the primary pulley and the secondary pulley, and configured to be clamped by a primary pulley pressure as a belt-clamping pressure at the primary pulley and a secondary pulley pressure as a belt-clamping pressure at the secondary pulley; and
   the hybrid vehicle employs an electric vehicle (EV) mode as a drive mode, and is configured to control the belt-clamping pressures based on a discharge oil of an oil pump when the EV mode is selected, wherein the EV mode employs the motor as a drive source without employing another drive source, and wherein the oil pump is configured to be driven by the motor;
   the hybrid vehicle control device comprising a controller configured to:
      obtain a parameter set including at least a motor torque value, wherein the motor torque value is a value of torque of the motor;
      learn a zero-point oil pressure command value based on the parameter set, wherein the friction clutch starts to have a non-zero torque capacity at the zero-point oil pressure command value;
      control rotational speed of the motor to a first motor idle rotational speed, in response to a satisfaction of a creep-cut condition requiring no creep torque of the motor when the hybrid vehicle is stationary with the EV mode selected; and
      reduce, after controlling the rotational speed of the motor to the first motor idle rotational speed, the rotational speed of the motor from the first motor idle rotational speed to a second motor idle rotational speed, in response to a completion of the learning of the zero-point oil pressure command value, wherein the second motor idle rotational speed is lower than the first motor idle rotational speed.

2. The hybrid vehicle control device as claimed in claim 1, wherein the controller is further configured to:
   set a lower limit of line pressure so as to prevent the belt from slipping due to a torque inputted during motor idle control, wherein the belt-clamping pressures are generated based on the line pressure; and
   set the second motor idle rotational speed to a motor rotational speed required to produce the line pressure of the lower limit with which the belt is prevented from slipping after the completion of the learning of the zero-point oil pressure command value.

3. The hybrid vehicle control device as claimed in claim 1, wherein the controller is further configured to determine that the creep-cut condition is satisfied, in response to a condition that the hybrid vehicle is stationary and a target torque of the friction clutch obtained by feedforward control is smaller than or equal to a predetermined value.

4. The hybrid vehicle control device as claimed in claim 3, wherein the controller is further configured to reduce a target motor idle rotational speed by a rotational speed control so as to control the rotational speed of the motor.

5. The hybrid vehicle control device as claimed in claim 1, wherein:
   the controller is further configured to perform a first operation in response to a satisfaction of the creep-cut condition when the hybrid vehicle is stationary with the EV mode selected; and
   the first operation is an operation to:
      reduce a secondary pressure command value toward a secondary pressure lower limit; and
      reduce the rotational speed of the motor when the hybrid vehicle is stationary, to the first motor idle rotational speed, in response to a condition that the secondary pressure command value has reached a predetermined value higher than the secondary pressure lower limit.

6. The hybrid vehicle control device as claimed in claim 5, wherein:
   the controller is further configured to start to reduce the rotational speed of the motor and the torque of the motor at a time when an oil pressure stability condition and a rotational speed stability condition are satisfied;
   the oil pressure stability condition is a condition where the secondary pressure command value is held at the secondary pressure lower limit; and
   the rotational speed stability condition is a condition where the rotational speed of the motor is held at the first motor idle rotational speed.

7. The hybrid vehicle control device as claimed in claim 6, wherein the controller is further configured to reduce the rotational speed of the motor from the first motor idle rotational speed to the second motor idle rotational speed at a descending gradient with which the rotational speed of the motor decreases gradually with time.

8. The hybrid vehicle control device as claimed in claim 5, wherein:
   the controller is further configured to perform a second operation in response to a satisfaction of a condition for return from motor idle control; and
   the second operation comprises an operation to:
      return the secondary pressure command value and the rotational speed of the motor to normal control values; and
      cause the torque of the motor to increase at an ascending gradient such that the torque of the motor increases gradually after a waiting time period has elapsed.

* * * * *